Figure 1:
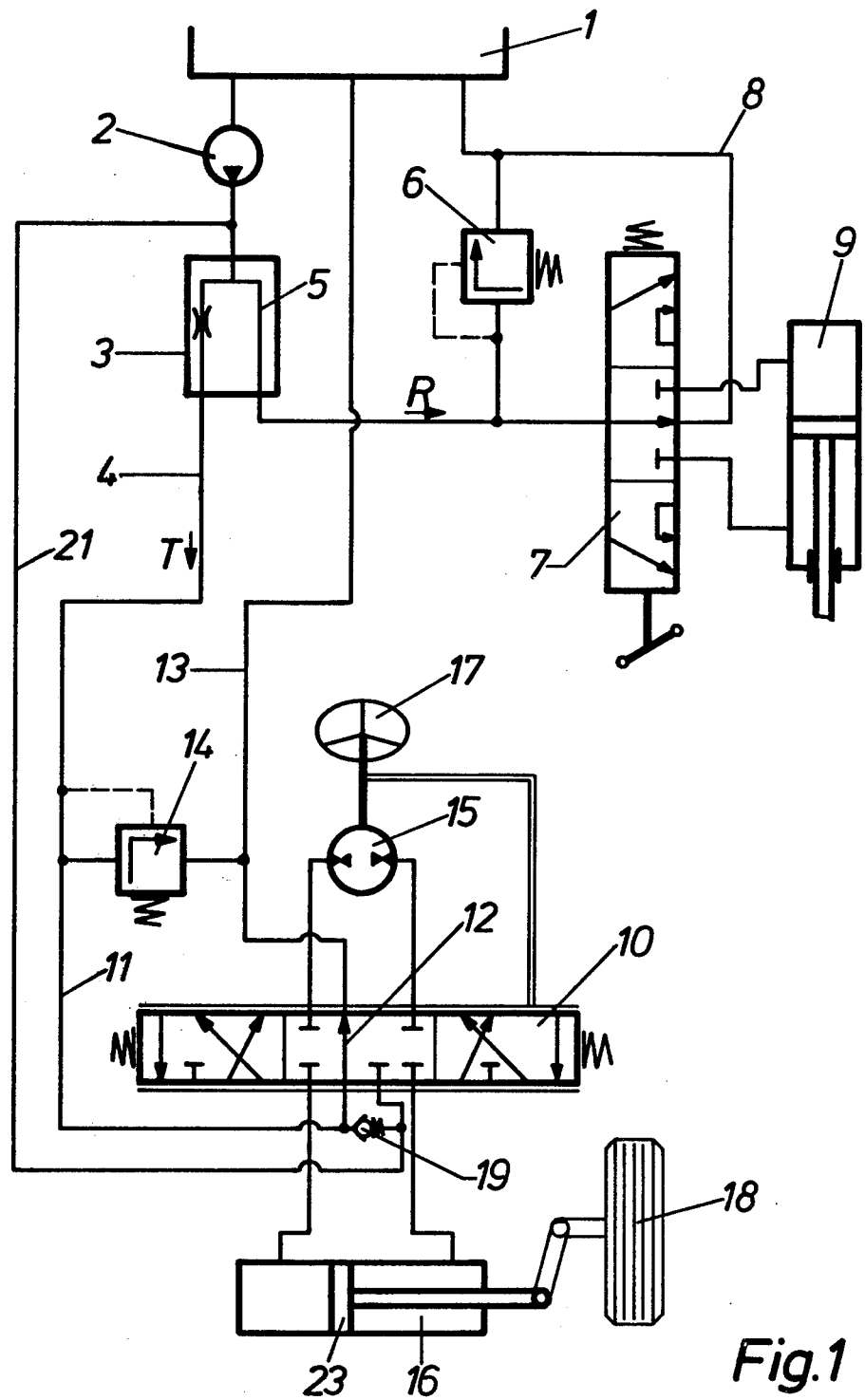

United States Patent [19]

Liebert et al.

[11] 4,174,018

[45] Nov. 13, 1979

[54] ARRANGEMENT FOR CONTROL OF TWO HYDRAULIC PRESSURE SYSTEMS, INCLUDING BOOSTER STEERING CONTROL

[75] Inventors: Karl-Heinz Liebert, Schwaebisch Gmuend; Werner Tischer, Böbingen, both of Fed. Rep. of Germany

[73] Assignee: Zahnradfabrik Friedrichshafen AG, Friedrichshafen, Fed. Rep. of Germany

[21] Appl. No.: 920,059

[22] Filed: Jun. 28, 1978

[51] Int. Cl.² ............................................. B62D 5/08
[52] U.S. Cl. ..................................... 180/132; 91/532
[58] Field of Search ................. 180/132; 91/513, 532, 91/516; 60/420, 422, 494

[56] References Cited

U.S. PATENT DOCUMENTS

| | | | |
|---|---|---|---|
| 4,005,636 | 2/1977 | Dunn | 91/516 |
| 4,070,857 | 1/1978 | Wible | 91/516 |
| 4,075,840 | 2/1978 | Jesswein | 60/422 |

FOREIGN PATENT DOCUMENTS

| | | | |
|---|---|---|---|
| 1183789 | 12/1964 | Fed. Rep. of Germany | 180/132 |
| 1550625 | 7/1969 | Fed. Rep. of Germany | 180/132 |

*Primary Examiner*—Joseph F. Peters, Jr.
*Assistant Examiner*—R. Schrecengost
*Attorney, Agent, or Firm*—Zalkind & Shuster

[57] ABSTRACT

A simplified overall hydraulic control system is provided for dual systems comprising a booster steering power cylinder and the power cylinder of an accessory of a work vehicle pressurized from a common engine driven hydraulic pump. The system utilizes conventionally constructed multiway valves for steering and accessory control and comprises flow dividing means effecting a constant minimum flow rate at all operational times for steering and variable flow rates for accessory power and additionally for steering dependent upon demand, essentially under vehicle operator control.

A main steering flow to the steering control valve can connect with the minimum steering flow through a one way valve when steering is effected, less such flow as may be directed for accessory power by operation of the accessory control valve. The one way valve is so arranged as to block main steering flow from connection to minimum steering flow in neutral steering control valve position, the minimum flow then shunting to the oil supply tank.

Main steering flow is additive to accessory power flow at all times but diminished in rate dependent upon a desired rate of accessory operation. Thus, when no steering is effected, all hydraulic pump output can be utilized for powering an accessory, except for the constant minimal steering flow which bypasses through the multiway steering control valve back to the system tank, a relatively small loss in accessory power.

2 Claims, 2 Drawing Figures

ARRANGEMENT FOR CONTROL OF TWO HYDRAULIC PRESSURE SYSTEMS, INCLUDING BOOSTER STEERING CONTROL

The invention disclosed herein provides for booster steering and accessory power control via a conventional multi-way valve constructions but with a simplification as compared with prior art devices such as shown in German Pat. Publication No. OS 15 50 625. Thus in the German publication a distributor valve and a supplemental valve are utilized, as well as a control valve. The arrangement provides for only a small working flow to the accessory if power steering is in progress. In the invention herein, the accessory can receive full flow pressure even during a steering operation, with a minimum flow utilized for steering at such time. This is on the assumption that maximum accessory power is needed, otherwise more pressure flow is utilized for steering. Due to interactions of the two valves in German Patent Publication No. OS 15 50 625 certain undesirable pressure variations are experienced which are eliminated in the present invention. German Pat. No. 1,183,789 cited in that German publication is of interest.

In the present invention the complex valving of the prior art is avoided by utilizing a flow divider which takes off a minimum power steering flow from the pump, sending the remainder of the pump output to both the main steering flow line to the steering control valve and to the accessory control valve, where it can be controlled for the respective purposes. However, by connecting the minimal steering flow line to the main steering flow line through a check valve which can open only if pressure drops in that line, it is possible to have available virtually all pump output on demand, at the will of the vehicle operator, for steering or accessory power and yet maintain at least a slow steering function if the accessory power demand is maximum.

A greater steering rate can be used with reduction in speed of operation of the accessory due to utilization of such amount of main steering flow as is routed to power the accessory. When the accessory is not used, high flow rate for rapid steering is available, although substantially a larger portion of total pump output is available at all times for accessory power as an inherent function of the system, such available flow shunting to the system tank when not required for accessory power.

Thus, the invention permits of the use of a smaller engine driven pump designed only for the flow rate desired to power an accessory and effects avoidance of pressure fluctuations in the system with changing operational conditions and also avoids loss of pump flow needed for accessory power as required, other than the minimal constant flow for slow steering when an accessory is powered when it is desired to steer the vehicle.

This minimal flow is always added to the main flow during a steering operation but otherwise shunted to the oil supply tank.

A detailed description of the invention now follows in conjunction with the appended drawing in which:

FIG. 1 shows a dual hydraulic system for a motor vehicle having generally conventional multiway control valves for controlling respective double acting power cylinders for a booster steering hydraulic circuit and for powering a work vehicle accessory in an accessory hydraulic circuit, e.g., a work vehicle accessory such as a dredge or the like, the multiway valves being shown in neutral or non-operating position.

Figure 2:
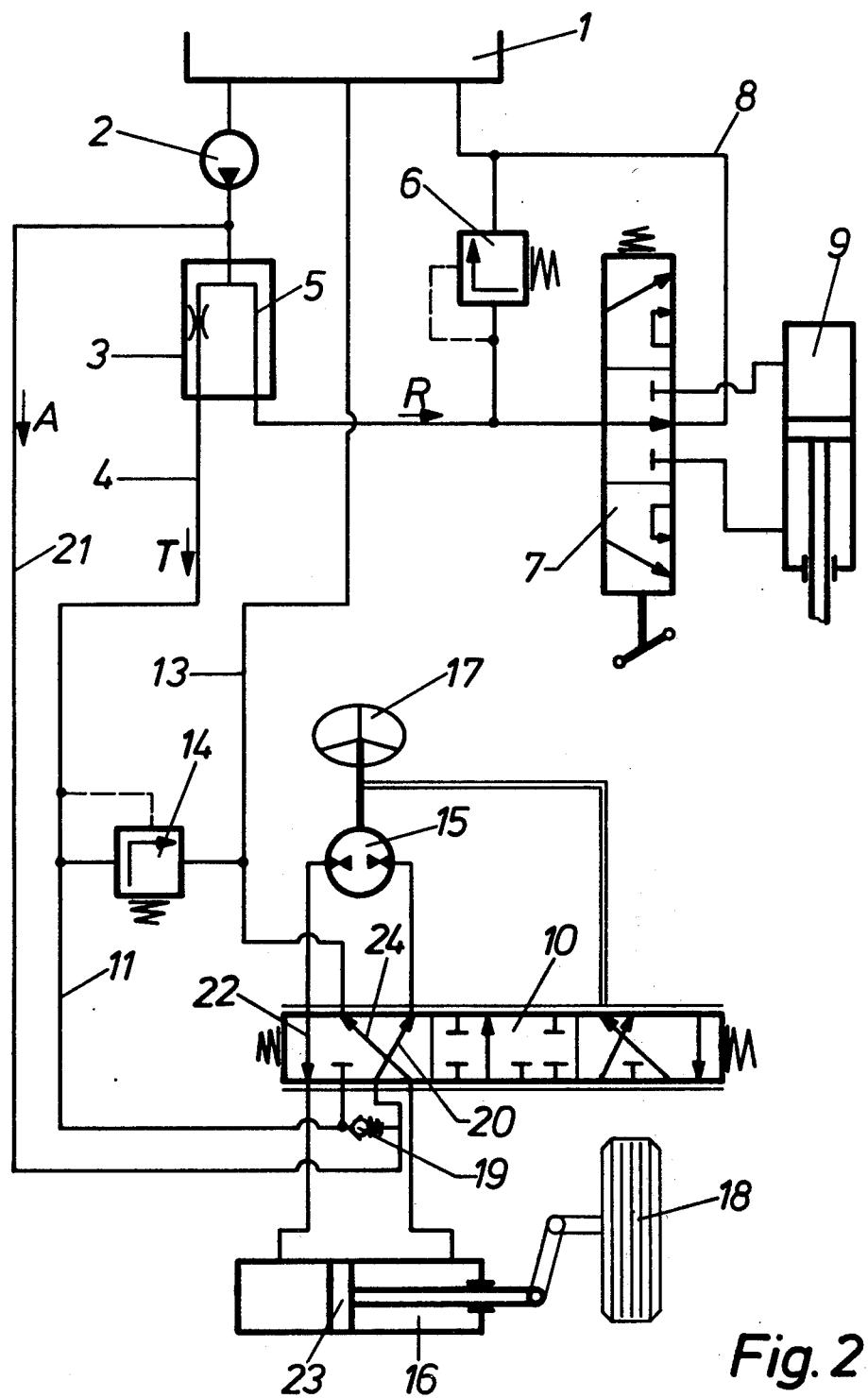

FIG. 2 shows the same hydraulic circuitry as FIG. 1, except that the steering control multiway valve has been shifted to effect steering of the vehicle to illustrate the flow thus effected.

Referring to FIG. 1, the system comprises the usual oil reservoir or tank 1 connecting to an engine-driven pump 2 which effects high pressure and runs continuously while the vehicle is in operation to deliver a quantity of oil sufficient for the needs of the system. Downstream of the pump is connected a flow divider 3, a commercial unit, containing branches one of which affords a constant rate of flow designated as T through the symbolic throttle shown.

Thus, a practically constant flow is maintained to steering control valve 10 through connections 4 and 11 downstream of flow divider 3 to a one way valve 19, subsequently to be described. The other branch connection 5 affords a residual flow R to the accessory multiway control valve 7 for operation of an accessory power cylinder 9.

At a juncture downstream of pump 2 but upstream of the flow divider 3 a branch connection 21 provided for flow to steering control valve 10 and such flow can in a manner to be subsequently described use either full flow or reduced flow, dependent on rate of steering and upon how much flow is diverted for accessory power cylinder 9.

It will be noted in FIG. 1 that for the neutral positions of the multiway valves, as shown, the flow in branch connection 21 is blocked at steering control valve 10 while the constant flow from flow divider 3 through connections 4, 11 is bypassed or shunted back to tank 1 via valve passage 12 and connecting means 13. The residual flow R is likewise bypassed through accessory control valve 7 and connecting means 8 back to tank 1.

Accordingly, at this time, if the pump output is 150 liters/minute the flow divider 3 affords 5 liters/minute for the constant flow T and 145 liters/minute as the residual flow R.

As safety measures, a relief valve 6 is provided for the residual flow and a relief valve 14 is provided for the constant flow T which flow, however, can be considerably increased in line 11 by flow from line 21 under steering conditions. Both relief valves obviously lead back to tank 1.

The relief valves take care of any situation of undesirably high pressures effected by extreme positions of the multiway control valves, all as conventionally known.

The operation of the multiway control valves for controlling their respective power cylinders is conventional and need not be described, wherein the steering control valve 10 pressurizes either of the chambers of the steering power cylinder 16 for moving piston 23 in one direction or the other, pressurizing one chamber while exhausting the other chamber. In a similar manner, the accessory control valve 7 affords pressurizing and exhausting of the accessory power cylinder 9.

Likewise conventional is a hand-operated steering wheel which actuates a metering pump 15 for metering the flow from pump 2 to and from the chambers of power cylinder 16 for steering the vehicle wheel 18, shown as a single wheel for purposes of illustration.

It will be understood that the accessory power cylinder 9 is dimensioned suitably to operate for maximum load with a flow through of the residual stream R of 145 liters/minute wherein pump 2 has an output of 150 liters/minute.

As stated hereinabove, the particular purpose of the invention is to use as small a power pump 2 as possible for the operation of the overall system while at the same time avoiding pressure fluctuations under various conditions where the prior art caused pressure fluctuations of an undesirable nature. Accordingly, in the neutral position, that is, straight ahead steering position of FIG. 1, there is no problem since all pump flow output then designated as T and R, is simply shunted back to the tank while the oil in connection 21 is static, being blocked as shown at steering control valve 10.

Particular attention is drawn to the novel feature of the invention, the one-way valve 19, which may be a spring biased check valve, as symbolized, connected intermediate the connections for flows T and A, leading to steering control valve 10. This is the crux of the invention and produces the advantageous effects claimed for it. Thus it will be noted that one-way valve 19 can open only to permit constant flow T from flow divider 3 to combine with flow A from the pump output under steering conditions, as shown in FIG. 2.

In FIG. 2 steering control valve 10 has been shifted to pressurize the left-hand chamber via valve passage 22 of power cylinder 16 upon rotation of wheel 17 actuating metering pump 15, all in a well understood manner, the right-hand chamber then exhausting via valve passage 24. Piston 23 then moves to the right.

At this time accessory control valve 7 is in neutral position but due to the open passageway for the flow A through valve passage 20 to the metering pump oil flows through branch connection 21 and this is at a rate of about 45 liters/minute. However, valve 19 can be opened by flow T, a rate of about 5 liters/minute, to join with the flow in the branch connection 21 for a combined flow of about 50 liters/minute for steering purposes. This would occur at the most rapid operation of the hand steering wheel 17, and since the output of pump 2 is assumed at 150 liters/minute, the circulatory residual flow R becomes 100 liters/minute.

It will thus be appreciated that by virtue of the one-way valve 19 the full flow A can be utilized for rapid steering in combination with the constant flow T which is otherwise blocked as seen in FIG. 2 by the position of the steering control valve but which passes through the one-way valve 19. Further, were it not for the one-way valve 19, it is obvious that the oil pressure in branch line 21 would be lost and unavailable to power the accessory cylinder 9 when the steering control valve 10 happens to be in the neutral position of FIG. 1 since such flow A would simply be shunting back to tank 1.

Accordingly, the metering pump 15 receives all necessary oil for effecting steering pressure in power cylinder 16, which as stated above, would be of the order of 50 liters/minute, assuming the accessory power cylinder 9 to be unpressurized. However, assuming during a steering operation it is desired to operate accessory power cylinder 9, valve 7 is shifted in a direction depending upon direction of movement desired of the cylinder piston and the residual flow R is then controlled through valve 7 to power cylinder 9 in such quantity corresponding to maximum output of pump 2 less the quantity flow A and less the quantity flow T. Since pump 2 has assumably a maximum output of 150 liters/minute and the total flows of A and T, as noted above, amount to 50 liters/minute, the residual flow R is of the order of 100 liters/minute, which would be the minimum flow it would receive assuming maximum rate of turning of the steering mechanism utilizing the full 45 liters/minute of flow A and the constant 5 liters/minute of flow T. This is, of course, governed by the rate of turning of the metering pump 15 and where it is desired to provide greater speed of accessory movement it is only necessary to slow down the actuation of the metering pump. This, of course, slows down the rate of wheel turning of the vehicle and some of the flow A now becomes available to add to the residual flow R to speed up actuation of the accessory power cylinder 9. Accordingly, the control of rate of steering of the vehicle and rate of accessory actuation is in the hands of the vehicle operator, one rate can be increased at the expense of the other, and vice versa.

From the position of valve 10 in FIG. 2 it will be apparent that flow A and flow T are always combined during a steering operation with the ratio of flows being controlled by how much flow is needed for cylinder 9 if in operation. Thus, upon initiating shift of control valve 10 the passage 12 conducting flow T is closed at that moment and, accordingly, such flow is brought under sufficient pressure to open valve 19 to combine with flow A present in line 21.

The conversion of flow A to flow R is extremely rapid to take care of all expected load problems, and in any event, there would always be a residual flow R of the order of 100 liters/minute available even at the highest rate of vehicle steering, so that no failure of load handling could occur.

Thus, with the steering control valve 10 in neutral position there will always be a residual flow R available of a maximum of 145 liters/minute, namely, full output of pump 2 less the draw-off of the constant flow T of substantially 5 liters/minute so that steering power will always be available regardless of the load conditions which power cylinder 9 must handle.

The invention makes possible that the pump 2 may be designed economically, only for needed maximum desired flow rate for power cylinder 9 plus a small standby and ever present steering flow T or, in other words, an output of 150 liters/minute. This is in contradistinction to the usual requirements of designing a pump such as pump 2, large enough so that it must take care of a high flow rate for load handling and another high flow rate for steering purposes. The invention provides for the controlling of the output of pump 2 in such a manner that flow at a desired rate can be had for either power cylinder of a dual system wherein pump output can be diverted to either hydraulic circuit for augmenting the rate of operation of either, albeit reducing the rate of operation of the other.

It will be obvious from FIGS. 1 and 2 that movement of the power piston of either hydraulic circuit is bidirectional by shifting of the respective control valve in respective direction, all in the manner well understood.

What is claimed is:

1. In a dual control hydraulic system having a common pump for pressurizing power cylinders of a booster steering hydraulic circuit and an accessory operating hydraulic circuit via a multiway steering control valve for steering control and accessory control valve for accessory operation, and including a tank and flow connecting means intermediate said tank and said pump and said multiway valves and said power cylinders whereby selective actuation of said multiway valves pressurizes and exhausts respective power cylinders and wherein said booster steering hydraulic circuit also has a constant flow device (3) connected intermediate said pump and the steering control valve (10) effecting a substantially constant flow available for power steering and wherein said system has connection means (4, 11) from said constant flow device (3) to said steering control valve (10) for said constant flow thereto;

the improvement wherein said flow connecting means comprises a first branch connection (21) for pump output, upstream of said constant flow device, to said steering control valve (10); and a second branch connection (5) for pump output, upstream of said constant flow device, to the accessory control valve (7);

wherein said minimal flow is shunted to said tank through said steering control valve (10) in neutral position thereof while flow from said first branch connection (21) is blocked thereat at that time;

and flow combining means (19) effecting combined flow from said first branch connection (21) to said flow connection means (4, 11) when said steering control valve (10) is operated for effecting steering control to provide combined flow therethrough to the power cylinder (16) of said steering hydraulic circuit;

and wherein use of accessory power during steering effects flow from said first branch connection (21) to said second branch connection (5) causing reduction of flow from said first branch connection (21) to said steering control valve, steering power being effected by said constant flow combined with flow from said first branch connection (21) passes to said second branch connection (5).

2. In a system as set forth in claim 1, wherein said flow combining means (19) comprises a one way valve connected intermediate said first branch connection (21) and said constant flow connection means (4, 11) and being arranged to block flow from said first branch connection (21) to said connection means (4, 11) to prevent shunting of said flow to said tank through said steering control valve in the neutral position thereof, thereby to maintain said flow from said first branch connection (21) available for accessory power; said one way valve being operable by said constant flow to effect said combined flow when said steering control valve is actuated to unblock flow from said first branch connection (21).

* * * * *